(12) United States Patent
Fuller (10) Patent No.: US 12,474,751 B2
(45) Date of Patent: Nov. 18, 2025

(54) SYSTEM FOR COOLING CIRCUIT BOARDS

(71) Applicant: Core Scientific Operating Company, Austin, TX (US)

(72) Inventor: Thomas Middleton Rutledge Fuller, Seattle, WA (US)

(73) Assignee: Core Scientific, Inc., Austin, TX (US)

( * ) Notice: Subject to any disclaimer, the term of this patent is extended or adjusted under 35 U.S.C. 154(b) by 253 days.

(21) Appl. No.: 18/286,993

(22) PCT Filed: Mar. 9, 2022

(86) PCT No.: PCT/US2022/019521
§ 371 (c)(1),
(2) Date: Oct. 13, 2023

(87) PCT Pub. No.: WO2022/192378
PCT Pub. Date: Sep. 15, 2022

(65) Prior Publication Data
US 2024/0201759 A1    Jun. 20, 2024

Related U.S. Application Data

(60) Provisional application No. 63/159,709, filed on Mar. 11, 2021.

(51) Int. Cl.
*G06F 1/20* (2006.01)
*H05K 7/20* (2006.01)

(52) U.S. Cl.
CPC ........... *G06F 1/20* (2013.01); *H05K 7/20145* (2013.01); *H05K 7/20172* (2013.01)

(58) Field of Classification Search
CPC ............ H05K 7/1434; H05K 7/20154; H05K 1/0203; H05K 7/20172; H05K 7/20145; H05K 7/20163; H05K 5/03; H05K 7/20209; H05K 7/2039; H05K 7/20918; H05K 7/20909; H05K 7/1427; H05K 5/0039;
(Continued)

(56) References Cited

U.S. PATENT DOCUMENTS 3,434,014 A    3/1969  Ralph
5,301,089 A *  4/1994  Takashima ............ G06F 13/409
                                                    361/744

(Continued)

FOREIGN PATENT DOCUMENTS

CN    203909700 U    10/2014
CN    212341802 U    1/2021
KR    101429893 B1   8/2014

OTHER PUBLICATIONS

English abstract for CN-212341802.
English abstract for CN-203909700.
Engilsh abstract for KR-101429893.

*Primary Examiner* — Michael A Matey
(74) *Attorney, Agent, or Firm* — Fishman Stewart PLLC (57) ABSTRACT

A system for improved air cooling of circuit boards such as cryptographic hash boards is disclosed. The system may comprise a tubular case and a number of circuit board support brackets affixed to the inside of the case in a radial pattern. Fans may be coupled to one or both ends of the tubular case to draw air through the tubular case. The tubular case may be cylindrical or a regular polygonal prism and may have a central channel for cables and controller cards.

19 Claims, 8 Drawing Sheets

(58) Field of Classification Search
CPC ........... H05K 7/20736; H05K 7/20409; H05K 7/209; G06F 1/20; G06F 1/181; G06F 1/183; G06F 1/206; G06F 1/16; E21B 36/001; E21B 47/0175; F28F 2280/105
See application file for complete search history.

(56) References Cited

U.S. PATENT DOCUMENTS

| | | | | |
|---|---|---|---|---|
| 5,889,651 A * | 3/1999 | Sasaki | ................... | H01L 23/467 |
| | | | | 361/699 |
| 6,501,653 B1 * | 12/2002 | Landsgestell | ...... | H05K 7/20927 |
| | | | | 174/15.1 |
| 6,735,086 B1 * | 5/2004 | Weber | .................. | H05K 7/1434 |
| | | | | 165/185 |
| 6,778,389 B1 * | 8/2004 | Glovatsky | .............. | H05K 1/189 |
| | | | | 361/720 |
| 7,180,736 B2 | 2/2007 | Glovatsky | | |
| 7,388,963 B2 * | 6/2008 | Han | ..................... | H04R 1/2819 |
| | | | | 381/345 |
| 7,679,908 B2 | 3/2010 | Yeh | | |
| 9,069,535 B2 * | 6/2015 | Degner | ................... | G08B 21/18 |
| 9,176,548 B2 * | 11/2015 | Degner | ................ | H05K 1/0203 |
| 9,644,471 B2 * | 5/2017 | Logan | ..................... | E21B 47/01 |
| 9,913,400 B2 * | 3/2018 | Degner | ..................... | G08B 5/36 |
| 10,212,816 B2 * | 2/2019 | Rieke | ....................... | H05K 1/147 |
| 2002/0170905 A1 * | 11/2002 | Peterson | ............ | H05K 7/20918 |
| | | | | 219/443.1 |
| 2003/0185689 A1 * | 10/2003 | Wang | ...................... | F04D 25/06 |
| | | | | 361/688 |
| 2005/0286226 A1 * | 12/2005 | Ishii | ................... | H05K 7/20918 |
| | | | | 257/E23.099 |
| 2010/0002383 A1 * | 1/2010 | Yeh | ......................... | G06F 1/183 |
| | | | | 361/695 |
| 2011/0277971 A1 * | 11/2011 | Lee | ........................ | F24F 1/0067 |
| | | | | 165/122 |
| 2014/0118937 A1 * | 5/2014 | Adrian | ............... | H05K 7/20172 |
| | | | | 361/695 |
| 2021/0028999 A1 | 1/2021 | Balakrishnan | | |

* cited by examiner

SYSTEM FOR COOLING CIRCUIT BOARDS

CROSS-REFERENCE TO RELATED APPLICATION

This application claims the benefit of and priority to U.S. Provisional Patent Application Ser. No. 63/159,709, filed on Mar. 11, 2021, the disclosure of which is hereby incorporated by reference in its entirety as though fully set forth herein.

TECHNICAL FIELD

The present disclosure generally relates to cooling circuit boards for computing devices such as in a data center.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Many blockchain networks (e.g., those used for cryptocurrencies like Bitcoin) require computationally difficult problems to be solved as part of the hash calculation. The difficult problem requires a solution that is a piece of data which is difficult (costly, time-consuming) to produce, but is easy for others to verify and which satisfies certain requirements. This is often called "proof of work". A proof of work (PoW) system (or protocol, or function) is a consensus mechanism. It deters denial of service attacks and other service abuses such as spam on a network by requiring some work from the service requester, usually meaning processing time by a computer.

Participants in the network operate standard PCs, servers, or specialized computing devices called mining rigs or miners. Because of the difficulty involved and the amount of computation required, the miners are typically configured with specialized components that improve the speed at which mathematical hash functions or other calculations required for the blockchain network are performed. Examples of specialized components include application specific integrated circuits (ASICs), field programmable gate arrays (FPGAs), graphics processing units (GPUs) and accelerated processing units (APUs).

Miners are often run for long periods of time at high frequencies that generate large amounts of heat. Even with cooling (e.g., high speed fans), the heat and constant operation can negatively impact the reliability and longevity of the components in the miners. ASIC miners for example have large numbers of hashing chips (e.g., 100's) that are more likely to fail as temperatures rise.

Many participants in blockchain networks operate large numbers (e.g., 100's, 1000's or more) of different miners (e.g., different generations of miners from one manufacturer or different manufacturers) concurrently in large data centers. Many data centers face cooling challenges, and data centers housing large numbers of miners or other CPU- or GPU-based systems used for compute-intensive workloads (e.g., rendering, artificial intelligence, machine learning, scientific simulation, data science) have even greater cooling challenges. This is due to the significantly higher density, power usage, heat generation, and duty cycle common to these devices and workloads.

The heat in data centers can often exceed the cooling ability of a computing device's built-in fans, which force air across heat sinks on the computing device in order to extract and exhaust the waste heat. Traditional methods for improving cooling of computing devices in data centers include mixing in refrigerated air to reduce the temperature of the air that is forced across the computing device by its built-in cooling fans. A significant drawback to this approach is that refrigeration uses significant amounts of energy on top of the energy already used by the computing devices themselves.

For at least these reasons, there is a desire for a more energy efficient solution to allow for improved efficient cooling and thermal management of groups of computing devices such as in a data center.

SUMMARY

An improved system for cooling circuit boards (e.g., cryptographic hash boards) is contemplated. By removing the heat-generating circuit boards from their individual computing device cases and positioning them in a larger tubular case (e.g., in a radial pattern) with one or more large fans instead of many smaller fans (that are limited by the size of individual computing devices' cases), the system may move more air and increase cooling efficiency. In one example embodiment, the system comprises a tubular case, a number of circuit board support brackets affixed to the inside of the tubular case in a radial pattern; and a fan coupled to one end of the tubular case, with the fan being configured to draw air into one end of the tubular case and force air out of the other end of the tubular case. In some embodiments, the tubular case may be cylindrical case or a regular polygonal prism case having greater than four sides (e.g., a hexagonal or octagonal prism).

In some embodiments, to further increase airflow a second fan may be coupled to a second end of the tubular case, with both fans being oriented to move air through the tubular case in a common direction (e.g., drawing cool in in from a cool aisle, forcing it through the tubular case to extract heat from the circuit boards and processors therein, and then out of the tubular case into a hot aisle). An air barrier may be attached to one end of the tubular case to prevent hot exhaust air from being recirculated (e.g., pulled from the hot aisle back into the cold aisle and back into the tubular case). In some embodiments, one or both of the fans may be coupled to the tubular case via a hinge permitting rotation away from the tubular case for more easy servicing of the circuit boards.

In some embodiments, the fan may be a cylindrical fan with an impeller, and in other embodiments the fan may be a bladeless loop air multiplier fan that receives air from an impeller outside the bladeless loop and directs air through the bladeless loop. The bladeless loop may be shaped to multiply the airflow generated and forced through the tubular case.

In some embodiments, the tubular case may be housed within a rectangular prism frame to enable stacking (e.g., vertically in racks). In some embodiments, a tubular channel may be included in the center of the tubular case. The tubular channel may have a width greater than or equal to the fan's central hub's diameter. The tubular channel may be configured to hold at least one controller board and cables connecting the controller board to at least a subset of the plurality of circuit boards housed within the tubular case. The tubular channel may have the same shape as the tubular case but with a smaller cross-section (e.g., both cylindrical prisms or both octagonal prisms).

In another embodiment, the system for cooling circuit boards may comprise a cylindrical case, a plurality of circuit boards supported within the cylindrical case, and a fan coupled to a first end of the cylindrical case and configured to move air through the cylindrical case for cooling. The circuit boards may be supported in a radial pattern around an inside surface of the cylindrical case. A cylindrical channel may be positioned in the center of the cylindrical case, and slotted brackets may be affixed to an inside surface of the cylindrical case and to an outside surface of the cylindrical channel to hold the circuit boards (e.g., in a radial pattern). One or more controller boards that receive data and coordinate the work performed by the circuit boards may be positioned within the cylindrical channel and connected to the circuit boards via cables.

The foregoing and other aspects, features, details, utilities, and/or advantages of embodiments of the present disclosure will be apparent from reading the following description, and from reviewing the accompanying drawings.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
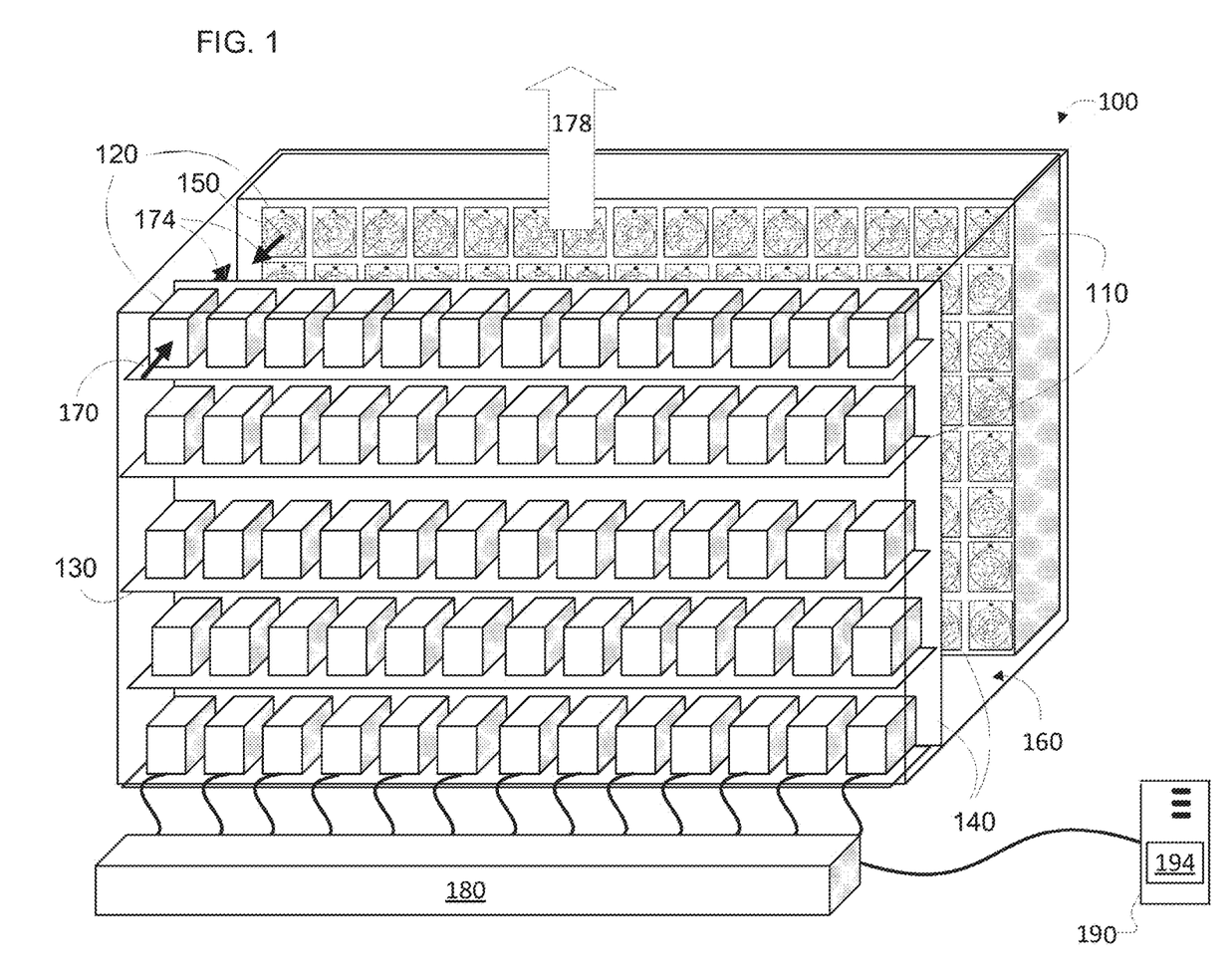
FIG. 1 is a diagram generally illustrating computing devices in a data center.

Turning now to FIG. 1, a diagram generally illustrating computing devices in a data center is shown. This example illustrates a pod 100 that has racks 110 that each have a number of shelves 130 for holding computing devices 120, thereby creating a two-dimensional array of computing devices on each rack or group of racks. In other embodiments, racks 110 may have rails that hold computing devices 120 in place on shelves 130. Each computing device 120 has one or more cooling fans 150 configured to draw air from outside the pod (often called a cool aisle) into the computing device for cooling, as shown by arrow 170. The moving air draws out heat from computing device 120 and is exhausted from the computing device as shown by arrows 174.

In some embodiments, computing device 120 may have two fans, one on the intake side and one on the exhaust side. In other embodiments multiple smaller fans may be used within computing device 120. Heated air is exhausted by computing devices 120 into the space between racks 110, called a hot aisle 160. The space between racks 110 is typically sealed except for one or more exhaust openings, typically in the ceiling, through which the heated air exits (as shown by arrow 178). In some embodiments, computing devices 120 are positioned adjacent to an air barrier 140 with openings large enough to allow the heated exhaust air from each computing device 120 to pass into hot aisle 160 but not escape out of hot aisle 160 other than through the exhaust vents.

Computing devices 120 may be networked together with a network switch 180 and may be managed by a management program 194 executing on a management computer 190. The management application or module is typically implemented in software (e.g., instructions stored on a non-volatile storage medium such as a hard disk, flash drive, or DVD-ROM).

In order to better cool computing devices 120, the management program 194 may be configured to dispatch instructions to computing devices 120 setting their operating parameters such as chip frequency, voltage, and fan speed.

Figure 2:
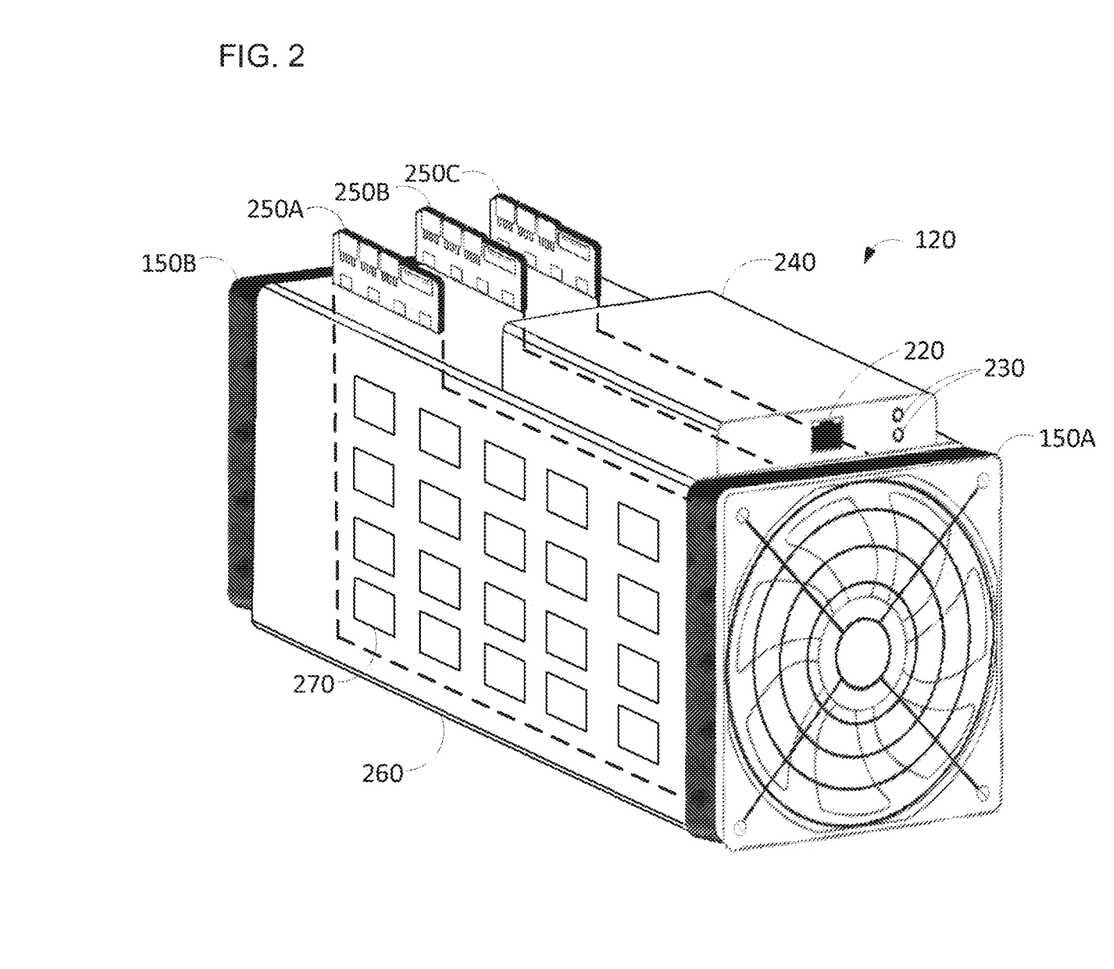
FIG. 2 is a diagram generally illustrating a perspective view of an example computing device.

Turning now to FIG. 2, a diagram generally illustrating a perspective view of an example computing device 120 is shown. In this example, computing device 120 is a cryptocurrency miner and includes a controller 240 that oversees operation of the multiple processing circuit boards 250A-C inside the device's case 260. In this embodiment, the controller 240 includes a network port 220 for communications, and one or more status indicator LEDs 230. Two fans 150A-B (one front and one rear) draw cool air into one side of the computing device 120 and expel waste heat through the other side. Other types of computing devices are possible and contemplated.

Circuit boards 250A-C each have multiple processors 270 (e.g., ASICs, GPUs, CPUs, FPGAs) that perform calculations, generating heat. For this reason, processors 270 often have heat sinks attached to them to cool the processors 270 by dissipating the waste heat into the air flowing through the computing device.

Figure 3:
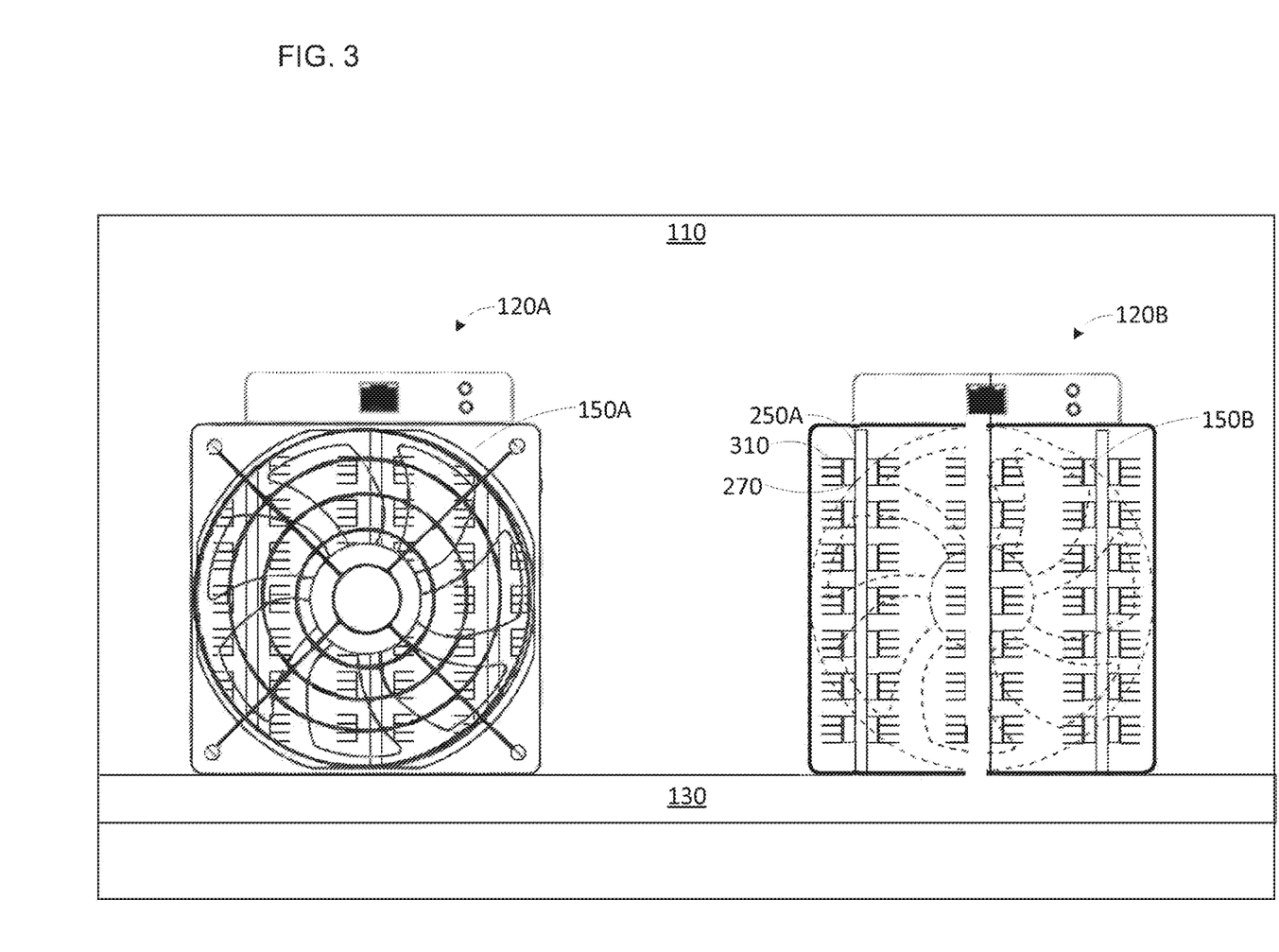
FIG. 3 is a diagram generally illustrating computing devices in a rack.

Turning now to FIG. 3, a diagram generally illustrating computing devices in a rack is shown. A frontal view of two computing devices 120A and 120B positioned on a shelf 130 is shown. In this view, front fans 150A and 150B are shown. Fan 150B is shown partially hidden to allow heatsink 310 connected to processor 270 on circuit board 250A to be seen.

One drawback to this approach is that each computing device may be reliant on one or more relatively small cooling fans. Due to their small size, they often have to spin at very high speeds or RPMs (rotations per minute) to move enough air to properly cool the computing device. For data centers having large numbers of computing devices, this can mean thousands or tens of thousands of relatively small fans constantly operating at very high speeds. With such a large number of cooling fans, data center technicians may be frequently required to replace worn out fans. Computing device manufacturers often attempt to save money by reducing the cost of these fans. These fans may be suboptimal not only for cost reasons, but also due to size limitations that are a function of the computing device's case. Each time a computing device is replaced, a new set of fans are included with the new computing device. Over time, the original fans and all the replacement fans can lead to significant cost, energy usage, and e-waste (electronics waste).

Figure 4:
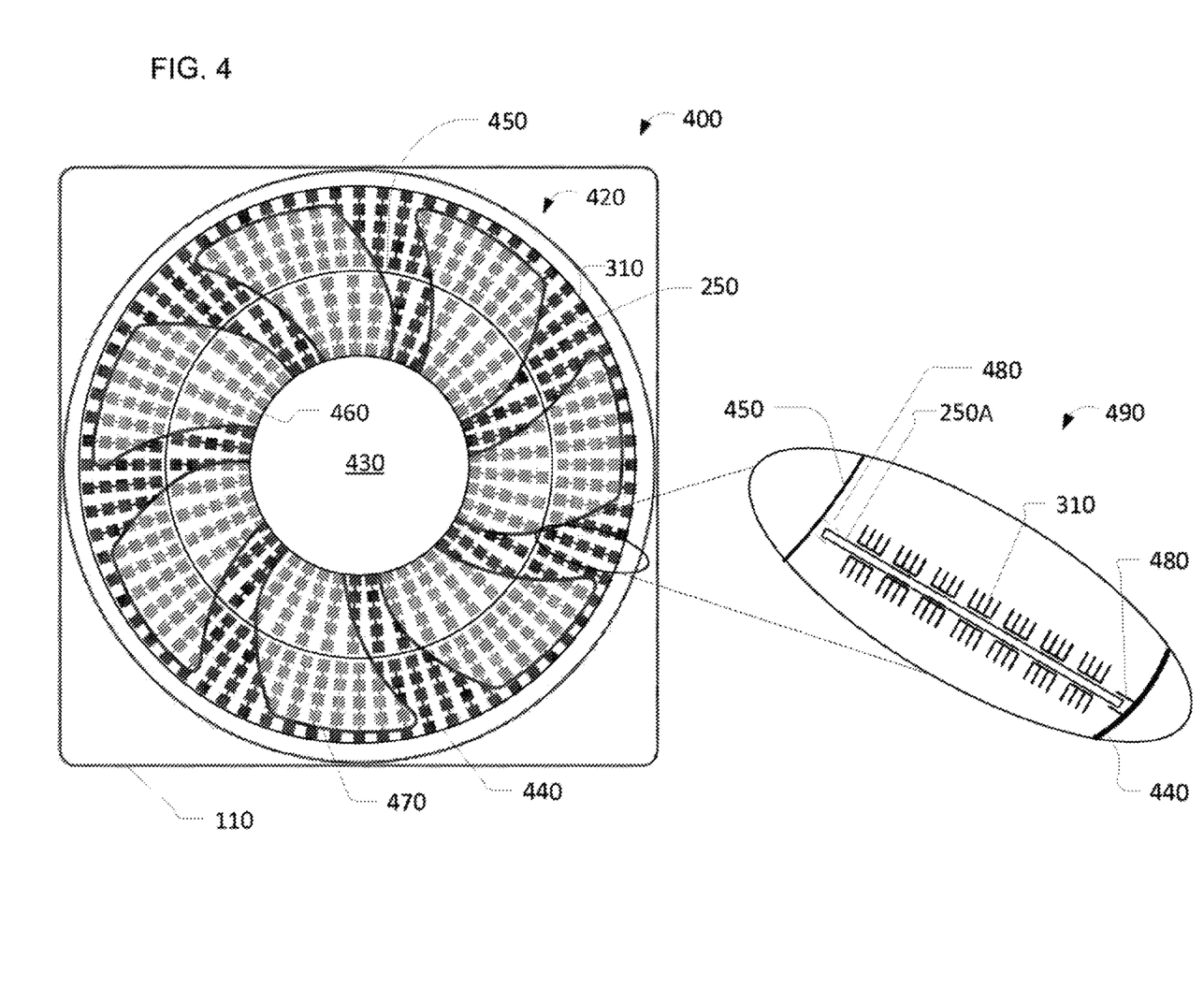
FIG. 4 is a diagram generally illustrating one example embodiment of an improved system for cooling circuit boards according to the teachings of the present disclosure.

Turning now to FIG. 4, a diagram generally illustrating a front view of one example embodiment of an improved system 400 for cooling circuit boards according to the teachings of the present disclosure is shown. In this embodiment, circuit boards 250 (with heatsinks 310) are removed from their original case and mounted in a tubular case 440 in a radial pattern. Tubular case 440 is open ended and mounted in a rack 110. Cooling of the circuit boards 250 is accomplished by a fan 420 forcing air through tubular case 440 and through heatsinks 310.

By using one large fan 420 instead of multiple smaller fans for each computing device 120, airflow and cooling efficiency may be improved. In some environments, the circuit boards may be purchased from the manufacturer directly without cases or fans, thereby reducing costs, shipping costs, and associated e-waste. A larger diameter fan may also be able to push a larger volume of air across circuit boards 250. By using fewer larger fans, the data center operator may reduce maintenance costs associated with replacing many smaller cheaper fans as they wear out.

In some embodiments, the fan 420 may comprise an impeller 470 having a width corresponding to a diameter of case 440 the radial pattern may include one or more inner cylindrical tiers such as tier 450. For each tier, the circuit boards 250 may be attached to the cylindrical tear with brackets. In some embodiments, two fans 420 may be used to further improve airflow, with one on each end of tubular case 440. In some embodiments, tubular case 440 may have a diameter approximately corresponding to the diameter of fan 420. A cylindrical channel 460 may be positioned within the tubular case 440 (e.g., at the center) to provide support for the circuit boards 250 in the innermost tier. In some embodiments, the diameter of the cylindrical channel 460 may correspond to the diameter of the fan's hub 430. The central cylindrical channel 460 may have lower airflow than the rest of the tubular case 440 due to the proximity of fan hub 430. For this reason, central cylindrical channel 460 may be used to house components requiring less cooling such as cables and controllers for the circuit boards to be housed.

Enlarged portion 490 illustrates one example embodiment of how a circuit board 250A may be secured in place by sliding into brackets 480 attached to tubular case 440 and inner cylindrical tier 450. Data and power cables for the circuit boards 250 may be run out one of the ends of the tubular case 440 to connect with power supplies and controllers, network cards, etc., located outside tubular case 440 or within cylindrical channel 460.

Figure 5:
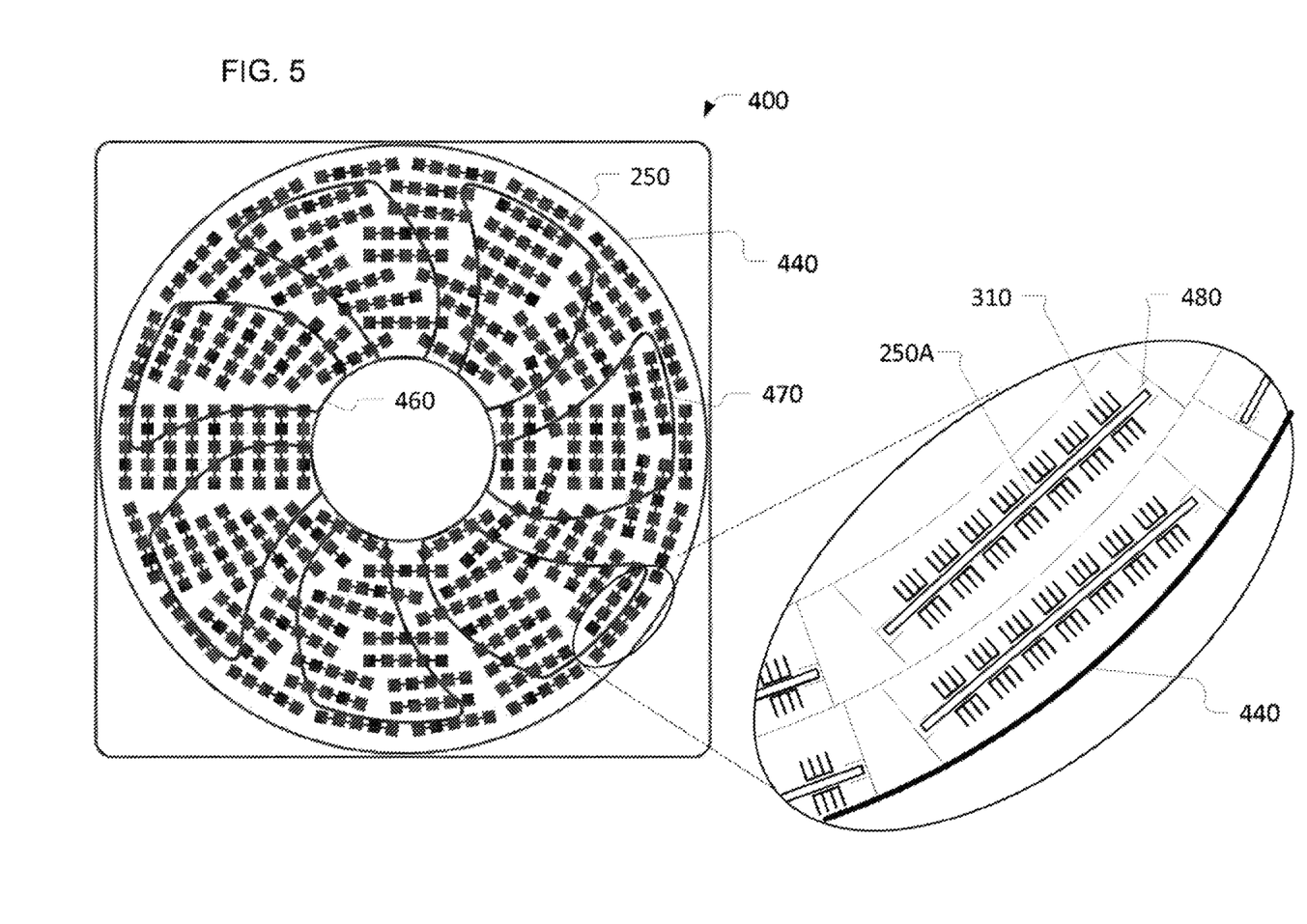
FIG. 5 is a diagram generally illustrating yet another example embodiment of an improved system for cooling circuit boards according to the teachings of the present disclosure.

Turning now to FIG. 5, a diagram generally illustrating yet another example embodiment of an improved system 400 for cooling circuit boards according to the teachings of the present disclosure is shown. In this embodiment, circuit boards 250 are in a different pattern within tubular case 440. The support structure to hold brackets 480 in place may for example be constructed of sheet metal or composite (e.g., 3D printed sections fastened together).

Figure 6:
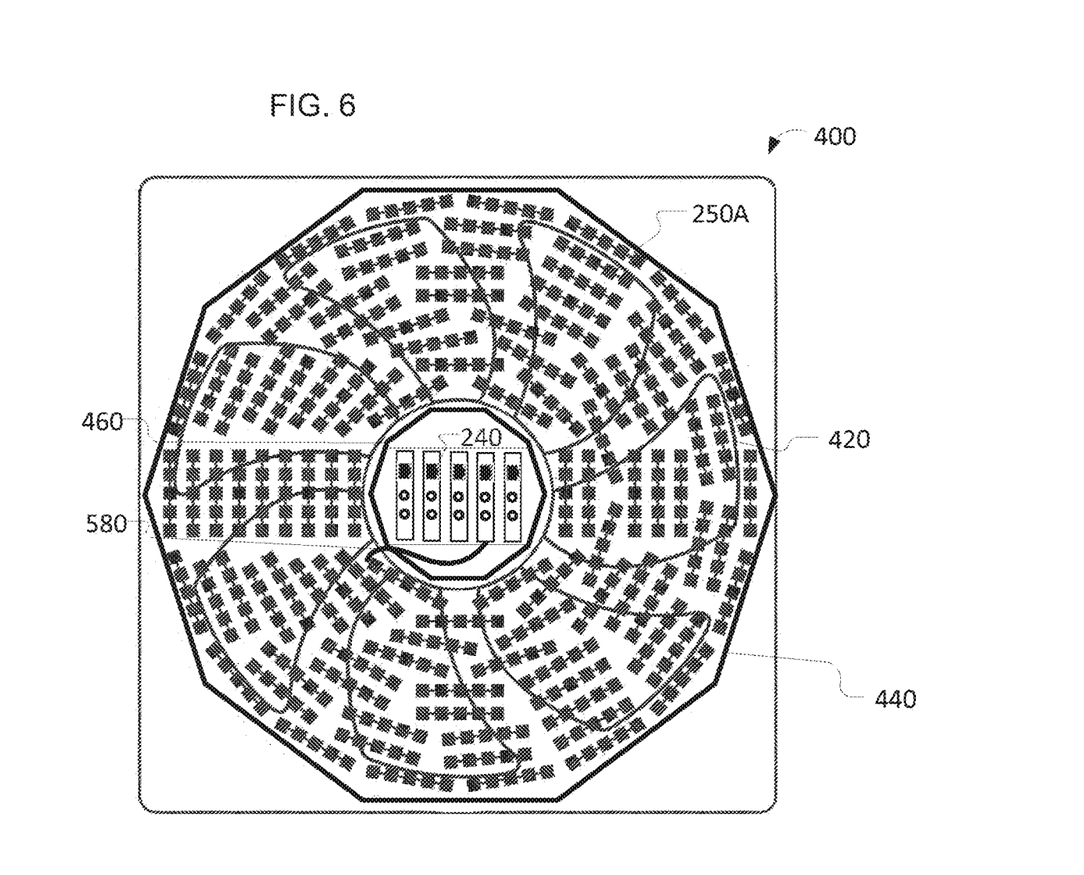
FIG. 6 is a diagram generally illustrating still another example embodiment of an improved system for cooling circuit boards according to the teachings of the present disclosure.

Turning now to FIG. 6, a diagram generally illustrating still another example embodiment of an improved system 400 for cooling circuit boards according to the teachings of the present disclosure is shown. In this embodiment, the tubular case 440 is a decagon prism, but other polygonal prisms that approximate a cylinder (e.g., hexagon prisms or octagon prisms) may also be used. In this example embodiment, controllers 240 are mounted inside cylindrical channel 460 and connected to circuit boards 250 via cables 580.

Figure 7:
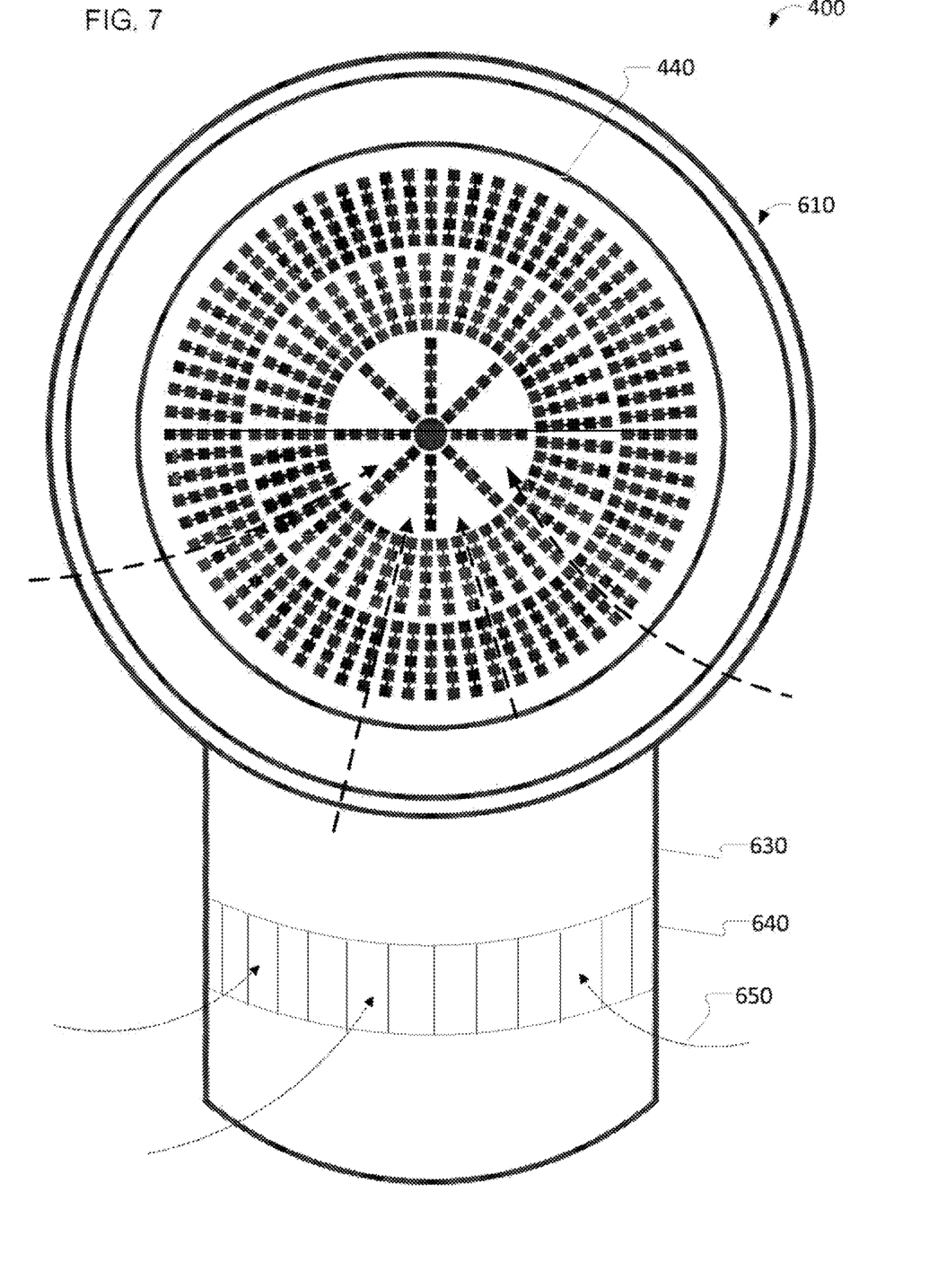
FIG. 7 is a diagram generally illustrating one example embodiment of an improved system for cooling circuit boards with a bladeless loop fan according to the teachings of the present disclosure.

Turning now to FIG. 7, a diagram generally illustrating one example embodiment of an improved system 400 for cooling circuit boards with a bladeless loop fan according to the teachings of the present disclosure is shown. In this embodiment, a bladeless loop fan (e.g., as described in U.S. Pat. No. 8,308,445) is used to force air through the tubular case 440 housing the circuit boards in a radial pattern. In this type of fan, the impeller is positioned in the base 630 and draws air in through air intake 640 as shown by arrows 650. The air is forced through bladeless loop 610 and is multiplied by air passing through the bladeless loop. One advantage of a bladeless loop fan of this type is that access to circuit boards 250 may be had without moving or even turning off the fan. Another advantage is that there is no central hub, improving air flow through the center of tubular case 440 and permitting circuit boards with higher cooling requirements to be placed there. As noted above, the fan may be configured in a push or pull configuration. In some embodiments, two such fans may be used together (e.g., one on each end), or a combination of one large impeller fan and one bladeless loop fan may be used.

Figure 8:
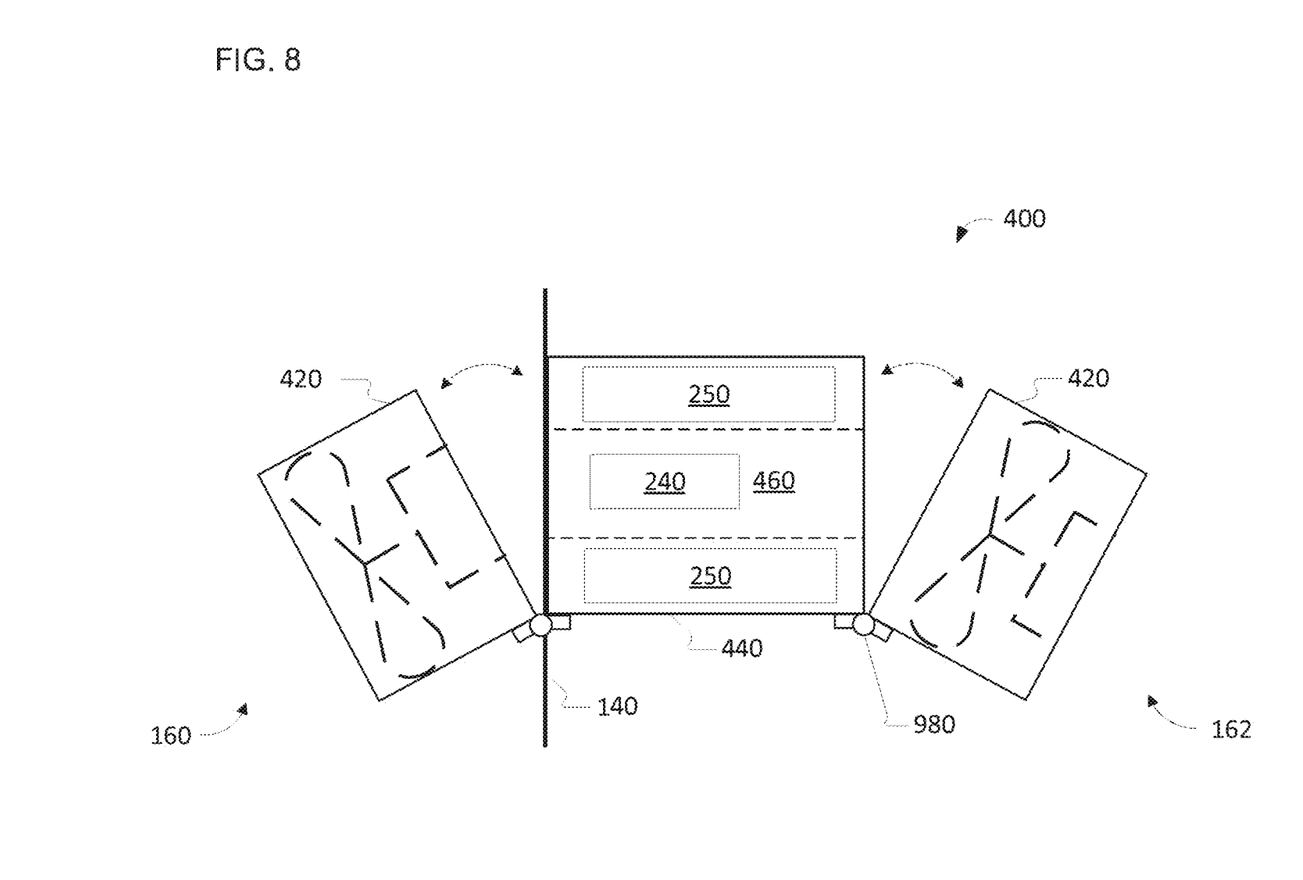
FIG. 8 is a diagram generally illustrating a top-down view of one example embodiment of an improved system for cooling circuit boards according to the teachings of the present disclosure.

Turning now to FIG. 8, a diagram generally illustrating a top-down view of one example embodiment of an improved system 400 for cooling circuit boards according to the teachings of the present disclosure is shown. In this example, two large impeller-type fans 420 are attached to tubular case 440 with hinges 980 that permit the fans 420 to be rotated away from tubular case 440, e.g., for maintenance. When rotated back into operating position, fans 420 pull in cool air from cool aisle 162, force it through tubular case 440, and out to hot aisle 160. Air barrier 140 may be sealed to the outer edge of tubular case 440 to prevent hot air in the hot aisle 160 from being drawn back in.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that a computer, a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. A system for cooling a plurality of circuit boards, the system comprising: a tubular case; a plurality of circuit board support brackets affixed to the inside of the tubular case in a first radial pattern; and a first fan coupled to a first end of the tubular case, wherein the first fan is coupled to the first end of the tubular case via a hinge permitting the first fan to be rotated away from the tubular case, and the first fan is configured to move air through the inside of the tubular case.

2. The system of claim 1, wherein the tubular case is cylindrical.

3. The system of claim 1, wherein the tubular case is a regular polygonal prism having greater than four sides.

4. The system of claim 1, wherein the circuit board support brackets are in a second radial pattern.

5. The system of claim 1, further comprising a second fan coupled to a second end of the tubular case, wherein the first fan and the second fan are oriented to move air through the tubular case in a common direction.

6. The system of claim 1, wherein the first fan is a bladeless loop air multiplier fan.

7. The system of claim 1, wherein the tubular case is housed within a rectangular prism frame for stacking.

8. The system of claim 1, further comprising a tubular channel in the center of the tubular case.

9. The system of claim 8, wherein the first fan has a central hub, wherein the tubular channel has a width greater than or equal to the central hub's diameter.

10. The system of claim 8, wherein the tubular channel is configured to hold at least one controller board and a plurality of cables connecting the at least one controller board to at least a subset of the plurality of circuit boards.

11. The system of claim 8, wherein the tubular channel has a shape the same as the tubular case but with a smaller cross-section.

12. A system for cooling a plurality of circuit boards, the system comprising: a cylindrical case; a plurality of circuit boards supported within the cylindrical case; and a fan coupled to a first end of the cylindrical case, wherein the fan is coupled to the first end of the cylindrical case via a hinge permitting the fan to be rotated away from the cylindrical case, and wherein the fan is configured to move air through the cylindrical case.

13. The system of claim 12, wherein the circuit boards are cryptographic hash boards.

14. The system of claim 12, wherein the circuit boards are supported in a radial pattern around an inside surface of the cylindrical case.

15. The system of claim 12, further comprising a cylindrical channel positioned in the center of the cylindrical case.

16. The system of claim 15, further comprising a plurality of slotted brackets, wherein each of the plurality of circuit boards is supported by one of the slotted brackets affixed to an inside surface of the cylindrical case and one of the slotted brackets affixed to an outside surface of the cylindrical channel.

17. The system of claim 15, further comprising a controller board positioned within the cylindrical channel.

18. The system of claim 13, wherein the fan comprises an impeller having a width corresponding to a diameter of the cylindrical case.

19. A system for cooling a plurality of circuit boards, the system comprising:
- a regular polygonal prism case;
- a plurality of circuit boards supported within the regular polygonal prism case; and
- a first fan coupled to a first end of the regular polygonal prism case by a first hinge,
- wherein the first fan is configured to move air through the regular polygonal prism case to cool the plurality of circuit boards;
- a second fan coupled to a second end of the regular polygonal prism case by a second hinge, wherein the second fan is configured to move air through the regular polygonal prism case to cool the plurality of circuit boards; and
- an air barrier connected between the second fan and the cylindrical case, wherein the air barrier has an opening to permit airflow through the regular polygonal prism case.

* * * * *